Patented Apr. 9, 1935

1,996,822

UNITED STATES PATENT OFFICE 1,996,822

SEPARATION OF 1,8-NAPHTHYLAMINE-SULPHONIC ACID

Harold G. Mow, Buffalo, N. Y., assignor to National Aniline & Chemical Company, Inc., New York, N. Y., a corporation of New York No Drawing. Application September 4, 1926, Serial No. 133,725

11 Claims. (Cl. 260—129)

This invention relates to the separation of 1,8-naphthylaminesulphonic acid from other naphthylaminesulphonic acids. It particularly refers to an improved process in the precipitation and separation of 1,8-naphthylaminesulphonic acid from 1,5-naphthylaminesulphonic acid.

In the nitration of naphthalene-1-sulphonic acid and the subsequent reduction of the resulting nitro-sulphonic acids, 1,8 and 1,5-naphthylaminesulphonic acids are produced as the principal products. Comparatively small amounts of other amino-naphthalenesulphonic acids are also usually present. It has been heretofore proposed to separate the 1,8-naphthylaminesulphonic acid from the mixture of crude acids, and particularly from 1,5-naphthylaminesulphonic acid, by utilizing the unequal solubility of their salts in water. For example, it is common practice to salt out the 1,8-naphthylaminesulphonic acid as the sodium salt by the addition of common salt to a neutral or alkaline solution of the crude amino-sulphonic acids and recover the 1,5-naphthylaminesulphonic acid as the free acid from the filtrate by acidification. The 1,8 and the 1,5-naphthylaminesulphonic acids thus obtained are usually very dark in color and are contaminated by considerable quantities of other aminosulphonic acids and various oxidation products. Neutral or alkaline solutions containing a mixture of the impure acids are rapidly oxidized by the air giving dark colored solutions. It is not economically feasible to purify the impure products thus obtained by recrystallization from water.

According to the present invention, it has been found that 1,8-naphthylaminesulphonic acid can be separated from 1,5-naphthylaminesulphonic acid, and other naphthylaminesulphonic acids, by precipitating it as the free acid by the acidification of a non-acid (i. e., a neutral or alkaline) solution containing a mixture of these acids in the presence of a sulphite, particularly sodium bisulphite.

The invention will be further illustrated by the following specific example but it will be understood that the invention is not limited thereto.

Example: To a slightly alkaline solution containing about 2 to 2.75 percent of 1,8-naphthylaminesulphonic acid and 0.8 to 1.5 percent of 1,5-naphylaminesulphonic acid in the form of their sodium salts, there is added and dissolved sufficient solid sodium bisulphite to give about a 0.5 to 1.5 percent solution. To this solution, which is well stirred and maintained at a temperature of about 30-40° C., there is slowly added hydrochloric acid until a sample changes brom-cresol-green test paper from a green to a permanent light yellow color. The amount of acid which is added is preferably such as to obtain and maintain the solution at an acidity which corresponds approximately to a hydrogen-ion concentration whose pH value lies between about 3 to 5, or better, about 3 to 4. When the precipitation of the 1,8-naphthylaminesulphonic acid is completed, it is filtered off, washed with water, and dried in any suitable manner. The filtrate is strongly acidified with hydrochloric or sulphuric acid, and after digesting for a short time the 1,5-naphthylaminesulphonic acid is filtered off, washed with water and dried. The aminonaphthalenesulphonic acids thus obtained are the free acids. They are white to grey in color and of superior quality. Ordinarily, the 1,8-acid thus obtained contains not over 1 to 1.5 percent of the 1,5-acid and the 1,5-acid contains not over 1 percent of the 1,8 acid. They are suitable for most commercial purposes, such as intermediates for the manufacture of dyes, without further purification.

In the above example, the proportions, concentrations, temperatures, etc., may vary over wide limits without departing from the spirit and scope of the invention. It will be noted that the presence of sodium bisulphite not only permits a superior separation of the 1,8 from the 1,5-naphthylaminesulphonic acid but that the decomposition of the aminosulphonic acids by oxidation by the air is hindered or prevented. It may be pointed out that the addition of sodium bisulphite alone to a neutral or slightly alkaline solution containing the 1,8 and 1,5-acids will produce a partial separation of the 1,8-acid from the 1,5-acid, by precipitation of a part of the 1,8-acid in the form of the sodium salt. By the addition of a quantity of any suitable acid just sufficient to increase the acidity of the solution to the proper extent, the rest of the 1,8-acid is precipitated. If, however, the solution is made too strongly acid then the 1,5-acid will also precipitate.

I claim:

1. In the separation of 1,8-naphthylaminesulphonic acid from 1,5-naphthylaminesulphonic acid, a process which comprises the precipitation of 1,8-naphthylaminesulphonic acid in the presence of sodium bisulphite in a solution having a hydrogen-ion concentration such that the pH value lies between about 3 and 5.

2. In the separation of 1,8-naphthylaminesulphonic acid from 1,5-naphthylaminesulphonic acid, a process which comprises adding sodium bisulphite to a solution containing the two acids as salts and then acidifying the solution with an innocuous acidifying agent.

3. In the separation of 1,8-naphthylaminesulphonic acid from 1,5-naphthylaminesulphonic acid, a process which comprises dissolving sodium salts of the acids in a slightly alkaline medium, adding thereto sufficient sodium bisulphite to give a 0.5 to 1.5 percent solution, and slowly adding hydrochloric acid to the well-stirred solution at a temperature of about 30° to 40° C. until a sample of the solution changes brom-cresol green test paper from a green to a permanent yellow color.

4. In the preparation of 1,8-naphthylaminesulphonic acid and 1,5-naphthylaminesulphonic acid, a process which comprises adding sodium bisulphite to a solution containing the two acids as salts, then acidifying the mixture with an innocuous acidifying agent to an extent just sufficient to precipitate substantially all of the 1,8-naphthylaminesulphonic acid, subsequently removing the same, and strongly acidifying with an innocuous acidifying agent the mother liquor from the 1,8-naphthylaminesulphonic acid to precipitate the 1,5-naphthylaminesulphonic acid.

5. In the separation of 1,8-naphthylaminesulphonic acid from other aminonaphthalenesulphonic acids, the step which comprises adding an alkali metal bisulphite to a non-acid solution containing the alkali metal salts of said acids.

6. In the separation of 1,8-naphthylaminesulphonic acid from 1,5-naphthylaminesulphonic acid, the process which comprises adding to a solution containing about 2 to 2.75 percent of 1,8-naphthylaminesulphonic acid and 0.8 to 1.5 percent of 1,5-naphthylaminesulphonic acid in the form of their sodium salts an amount of sodium bisulphite sufficient to give about a 0.5 to 1.5 percent solution of the same, and then acidifying the well-stirred mixture with an innocuous acidifying agent until a sample of the solution changes brom-cresol-green test paper from a green to a yellow color.

7. In the separation of 1,8-naphthylaminesulphonic acid from other amino-naphthalenesulphonic acids, the step which comprises adding an alkali metal bisulphite to a non-acid solution containing the soluble salts of said acids.

8. In the separation of 1,8-naphthylaminesulphonic acid from other amino-naphthalenesulphonic acids, the step which comprises acidifying a solution containing the soluble salts of said acids and a soluble sulphite with an innocuous acidifying agent, whereby 1,8-naphthylaminesulphonic acid is precipitated.

9. In the separation of 1,8-naphthylaminesulphonic acid from other amino-naphthalenesulphonic acids, the step which comprises adding an innocuous acid to a solution containing the soluble salts of said acids and a soluble bisulphite, whereby 1,8-naphthylaminesulphonic acid is precipitated.

10. In the separation of 1,8-naphthylaminesulphonic acid from 1,5-naphthylaminesulphonic acid, a process which comprises adding an innocuous mineral acid to a solution containing the alkali metal salts of said naphthylaminesulphonic acids and an alkali metal bisulphite.

11. In the separation of 1,8-naphthylaminesulphonic acid from 1,5-naphthylaminesulphonic acid, a process which comprises adding hydrochloric acid to a solution containing the sodium salts of said naphthylaminesulphonic acids and sodium bisulphite.

HAROLD G. MOW.